(12) United States Patent
Chen

(10) Patent No.: US 11,208,132 B2
(45) Date of Patent: Dec. 28, 2021

(54) WHEELED FOLDING TRAY CART WITH SAFETY DEVICE AND METHOD

(71) Applicant: Jack Chen, Henderson, NV (US)

(72) Inventor: Jack Chen, Henderson, NV (US)

( * ) Notice: Subject to any disclaimer, the term of this patent is extended or adjusted under 35 U.S.C. 154(b) by 51 days.

(21) Appl. No.: 16/246,460

(22) Filed: Jan. 12, 2019

(65) Prior Publication Data

US 2020/0223463 A1 Jul. 16, 2020

(51) Int. Cl.
*B62B 3/02* (2006.01)
*A47B 43/00* (2006.01)

(52) U.S. Cl.
CPC .............. *B62B 3/02* (2013.01); *A47B 43/00* (2013.01); *B62B 2205/003* (2013.01); *B62B 2205/02* (2013.01); *B62B 2205/32* (2013.01)

(58) Field of Classification Search
CPC .......... B62B 3/02; B62B 3/002; A47B 43/00; A47B 43/04
USPC .......................................... 211/198; 280/651
See application file for complete search history.

(56) References Cited

U.S. PATENT DOCUMENTS

| | | | |
|---|---|---|---|
| 3,093,247 A * | 6/1963 | Erickson | A47B 31/04 108/188 |
| 3,138,122 A * | 6/1964 | Mondineu | A47B 31/04 108/171 |
| 3,163,296 A | 12/1964 | Hohnstein | |
| 3,436,092 A * | 4/1969 | Udo | A47B 31/04 280/651 |
| 4,303,285 A | 12/1981 | Weigers | |
| 4,740,010 A * | 4/1988 | Moskovitz | A47B 31/04 108/170 |
| 5,401,096 A | 3/1995 | Stang | |
| 5,806,864 A * | 9/1998 | Zielinski | B62B 3/02 280/42 |
| 6,039,325 A * | 3/2000 | Steinetz | F16J 15/0812 277/528 |
| 6,123,207 A * | 9/2000 | Mast | A47B 43/00 211/149 |
| 6,349,962 B1 * | 2/2002 | Johanson | B62B 3/02 280/42 |
| 6,443,481 B1 * | 9/2002 | Stravitz | A47B 31/04 211/201 |

(Continued)

*Primary Examiner* — Jeffrey J Restifo
(74) *Attorney, Agent, or Firm* — John D. Long, Esq; Long & Chybik

(57) ABSTRACT

The invention is a wheeled folding tray cart and method. The wheeled folding tray cart comprises a collapsible wheeled framework pivotally supporting a set of split shelves, each split shelf comprises a pair of half shelves. The wheeled folding tray cart moves between an open operating position wherein the set of split shelves are held in spaced-apart, stacked, horizontal orientation within the collapsible wheeled framework and a closed storage position wherein the collapsible wheeled framework is collapsed in manner to move each half shelf pair into an accordion-like, inverted "V"-shaped or accordion like configuration. An extension coiled spring attached to the collapsible wheeled framework assists in the movement of the wheeled folding tray cart between open operating position and the closed storage position. A sheath encloses at least a portion of the spring to provide resistance to the spring's movement to limit potential operator exposure to pinch injuries.

6 Claims, 4 Drawing Sheets

(56) References Cited

U.S. PATENT DOCUMENTS

| | | | |
|---|---|---|---|
| 6,685,199 B2* | 2/2004 | Stravitz | A47B 31/04 211/201 |
| 6,851,564 B2* | 2/2005 | Ng | A47B 43/00 211/149 |
| 7,389,887 B2* | 6/2008 | Liang | A47B 43/00 211/149 |
| 7,637,220 B2* | 12/2009 | Fu | A47B 43/00 108/115 |
| 8,256,630 B2* | 9/2012 | Zhu | A47F 5/10 211/149 |
| 8,523,197 B2* | 9/2013 | Baatz | A47B 31/04 280/42 |
| 8,672,147 B2* | 3/2014 | Lam | A47F 7/18 211/149 |
| 8,761,850 B2 | 3/2014 | Smith et al. | |
| 8,973,940 B2* | 3/2015 | Chen | B62B 3/02 280/639 |
| 9,079,597 B2* | 7/2015 | Gonzalez | A47B 43/00 |
| 9,474,368 B2* | 10/2016 | Frankel | A47F 5/10 |
| 9,835,408 B2* | 12/2017 | Parks | F41C 33/002 |
| 9,913,533 B1* | 3/2018 | Ke | A47B 96/021 |
| 10,058,171 B2* | 8/2018 | Deng | A47B 96/021 |
| 10,292,491 B1* | 5/2019 | Ke | A47F 5/137 |
| 10,604,170 B1* | 3/2020 | Davis | B62B 3/02 |
| 2006/0226101 A1* | 10/2006 | Liang | A47B 43/00 211/149 |
| 2007/0240866 A1* | 10/2007 | Von Feldt | A21B 3/00 165/165 |
| 2011/0068072 A1* | 3/2011 | Zhu | A47B 43/00 211/149 |
| 2011/0155680 A1* | 6/2011 | Pong | A47B 31/04 211/199 |
| 2011/0253660 A1* | 10/2011 | Pong | A47B 31/04 211/198 |
| 2016/0066687 A1* | 3/2016 | Frankel | A47B 55/02 211/149 |

* cited by examiner

WHEELED FOLDING TRAY CART WITH SAFETY DEVICE AND METHOD

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention may relate to wheeled folding tray carts that could be opened out and down into an operating position for transporting goods and after transporting the goods to the desired destination, the folding wheeled tray cart may then be folded up into a compact or storage position until needed again. More particularity to those folding wheeled tray carts that may embodied safety devices to possibly help prevent pinching or crushing injures due to the folding and unfolding of nature of the folding wheeled tray cart operations.

BACKGROUND

Folding wheeled tray carts may be generally used in a wide variety of industries, including but not limited to the food service and preparation industries, to transport a wide variety of goods. In periods of non-use, the folding wheeled tray carts may be placed in a folded or otherwise compacted state providing a smaller foot print for storage.

A folding wheeled tray cart may comprise a collapsible framework of suitable material (e.g., plastic, metal, etc.) standing on a set of castored wheels. The collapsible framework may pivotally hold a set of split shelves. Each split shelve could comprise of a half shelf pair. The folding wheeled tray cart have an operating position and a storage position. Moving into the storage position could have sections of the collapsible framework move closer together to allow a center section of the split shelves to move upward and allowing the corresponding half shelves to generally fold together like inverted butterfly wings (e.g., an upside down "V.) The wheeled folding tray cart's operative position may have the framework sections generally move further apart to drop down the center section of each split shelf and have the individual half shelf pairs lie horizontally flat.

The folding wheeled tray cart could further comprise one or more extension (e.g., tension) coil springs that could facilitate the movement of the folding wheeled tray cart between open and folded positions. Each extension coil spring could be located proximate to the top split shelf to respectively connect outer portions of the collapsible framework together. When the split shelves are in their horizontal operative positions, the extension coil spring(s) could be stretched to impart a bias for a movement of the split shelve. As the folding wheeled tray cart moved into the open operating position by the operator pushing down on the framework, top split shelves or both, a tension or bias exerted by the stretched-out extension coil spring(s) could bring about a snap down movement of the half shelve pairs just as they are reaching their full horizontal operative positions.

One possible issue with this kind of folding wheeled tray cart could be that movement of the folding wheeled tray cart towards the open operating position could initially presents a gap between the half shelves of a split shelf into which parts of the operator's hand (e.g., fingers) could protrude and could be significantly compacted (e.g., be pinched and suffer a crushing injury) as the cart's opening movement is completed. As the half shelving moves from an angled or canted position from about 15 degrees above horizontal (e.g., providing maximum stretching of the spring) down to horizontal position, the force of the extension coil spring(s) could increase to further force a sharp and sudden (snap down) closing of the gap. This danger has been recognized to the extent that significant number of folding wheeled tray cart manufacturers often place warning labels about this pinching danger on the folding wheeled racks themselves.

One possible solution to this matter could be the present invention that could comprise applying a double open-ended resilient sheath through which a respective extension coil spring could be placed so that at least the ends of the extension coil spring could extend out of the sheath to generally allow the extension coil spring to attach to respective outer sections of the collapsible framework. The sheath could impart resistance to the movement of the extension coil spring in a manner that may slow down the extension coil spring's movement when the extension coil spring is moving between a relaxed (storage) state to an extended (operating) state. The imparted sheath resistance could correspondingly slow the movement of the folding wheeled tray between the open and storage positions. In one possible embodiment, the sheath could slow the tray's opening-closing process to the movement midpoint between the two cart positions or spring states. At the movement midpoint, the operator may need have to exert more pressure upon the wheeled folding tray cart to complete opening of the folding wheeled rack. Slowing the opening process could give the operator more time to notice and remove any hand or other body portions from the closing gap to prevent crushing or pinching injuries or to otherwise place the operator's hands out of crushing danger.

SUMMARY OF ONE EMBODIMENT OF THE INVENTION

Advantages of One or More Embodiments of the Present Invention

The various embodiments of the present invention may, but do not necessarily, achieve one or more of the following advantages:

to provide a spring-loaded wheeled folding tray cart that moves between an operating and storage position with a means to avoid the pinching of the operator's bodily parts by the cart;

the ability to partially encapsulate a spring of a wheeled folding tray rack to slow the transition of movement of the cart between an operating and storage positions to a midpoint between the two positions;

to provide a spring-loaded wheeled folding tray cart that requires additional operator intervention to complete a transition from movement midpoint of the cart set between operating and storage positions;

the ability to give greater control over operating a spring-loaded wheeled folding tray cart to prevent pinch or crushing injuries;

to provide a spring movement dampening or retarding apparatus to a spring-loaded wheeled folding tray rack to require greater operator interaction to move the cart between operating and storage positions; and the ability to require greater operator action and attention to move the spring-loaded wheeled folding tray rack between operating and storage positions.

These and other advantages may be realized by reference to the remaining portions of the specification, claims, and abstract.

BRIEF DESCRIPTION OF ONE EMBODIMENT OF THE PRESENT INVENTION

One possible embodiment of the invention could be a wheeled folding tray cart comprising a collapsible wheeled framework pivotally supporting a set of split shelves and an extension coil spring-sheath combination attached to the framework, each split shelf comprises a pair of half shelves, the wheeled folding tray cart is configured to move between an open operating position wherein the set of split shelves are held in spaced-apart, stacked, horizontal orientation within the collapsible wheeled framework and a closed storage position wherein the collapsible wheeled framework is collapsed in manner to move each half shelf pair into an accordion-like, inverted "V"-shaped or accordion like configuration. An extension coiled spring-sheath combination assists in the movement of the wheeled folding tray cart between open operating position and the closed storage position wherein the sheath provides resistances to the extension coil spring's movement to slow the wheeled folding tray cart movement.

Another possible embodiment could be a method of operating a wheeled folding tray cart, comprising of the following steps providing a wheeled folding tray cart comprising a collapsible wheeled framework pivotally supporting a set of split shelves, each split shelf comprises a pair of half shelves to allow the wheeled folding tray cart to move between an open operating position wherein the set of split shelves are held in spaced-apart, stacked, horizontal orientation within the collapsible wheeled framework and a closed storage position wherein the collapsible wheeled framework is collapsed in manner to move each half shelf pair into an accordion-like, inverted "V"-shaped configuration, an extension coil spring attached to the collapsible wheeled framework assists in the movement of the wheeled folding tray cart between open operating position and the closed storage position, a sheath encloses at least a portion of the extension coil spring, the sheath being configured to provide resistance to the extension coil spring's motion relative to the sheath; moving the collapsible wheeled framework to move a portion of extension coil spring through an interior of the sheath; and resisting the movement of the extension coil spring relative to the sheath to slow a movement of the collapsible wheeled framework between an open operating position and closed storage position.

The above description sets forth, rather broadly, a summary of one embodiment of the present invention so that the detailed description that follows may be better understood and contributions of the present invention to the art may be better appreciated. Some of the embodiments of the present invention may not include all the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
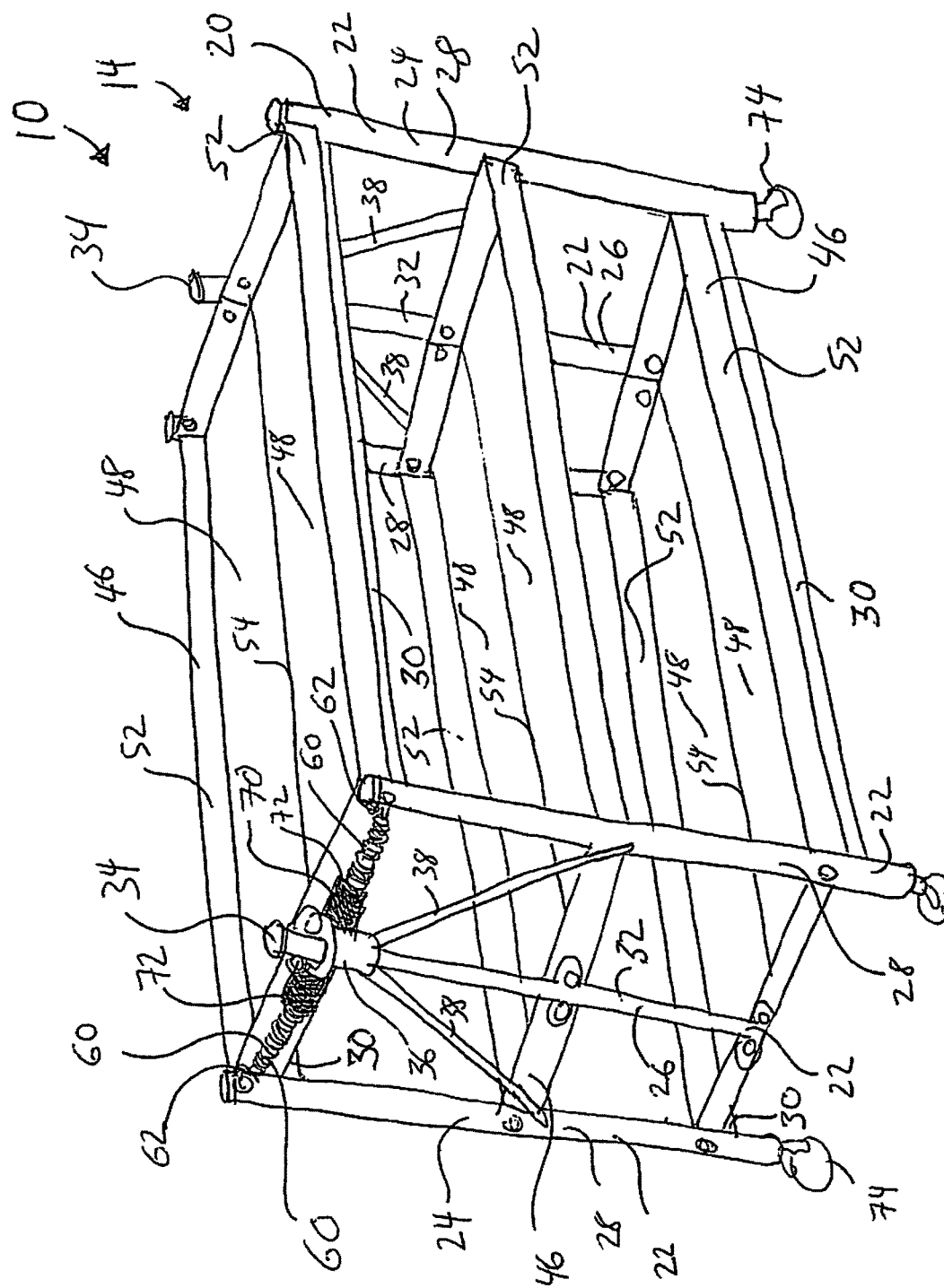
FIG. 1 is substantially a perspective end view of one embodiment of a wheeled folding tray cart in the open or operating position with extension coil spring in an extended state.
Figure 2:
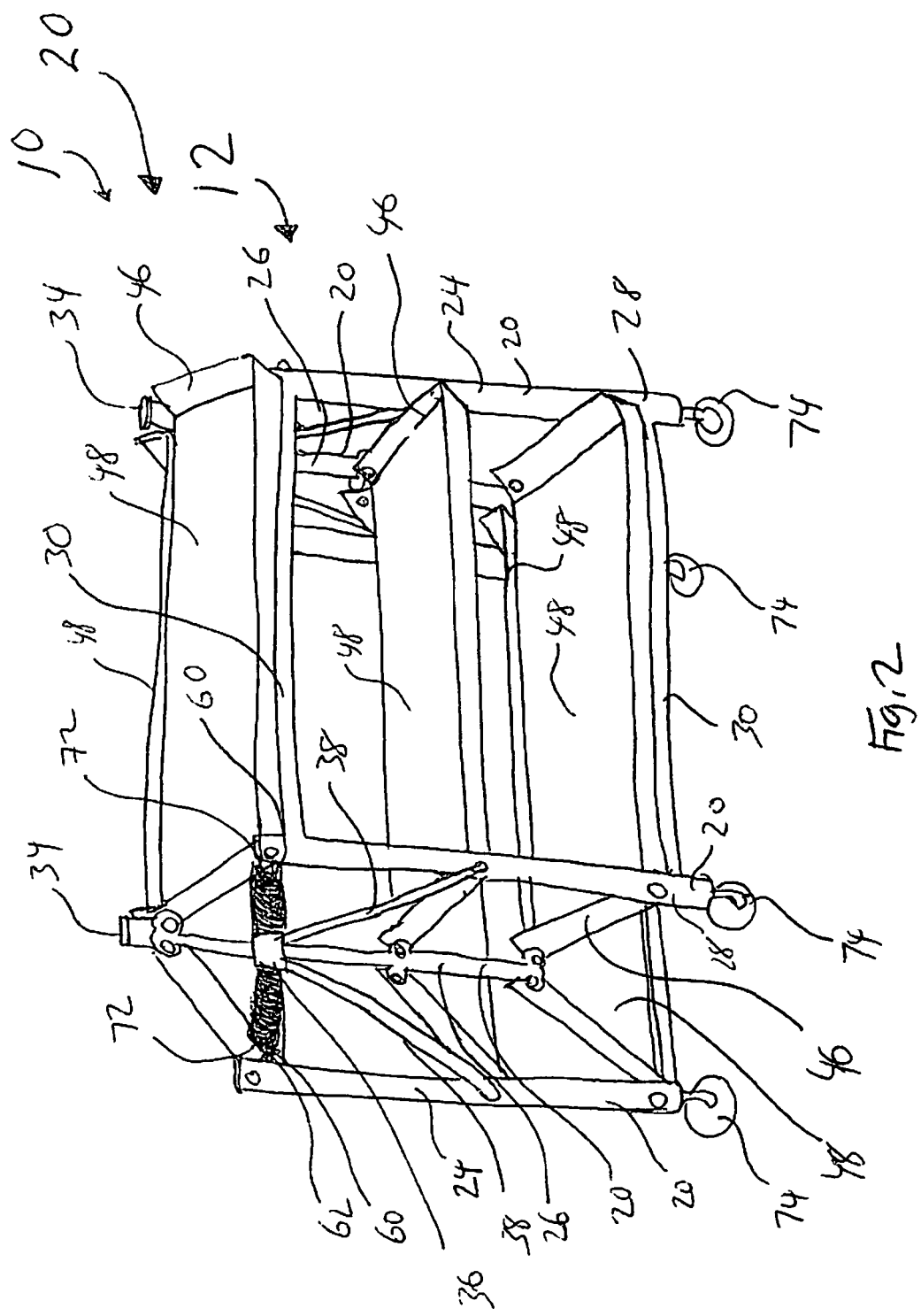
FIG. 2 is a perspective end view of one embodiment of a wheeled folding tray cart in the folded or storage position with operating springs in a resting state.
Figure 3:
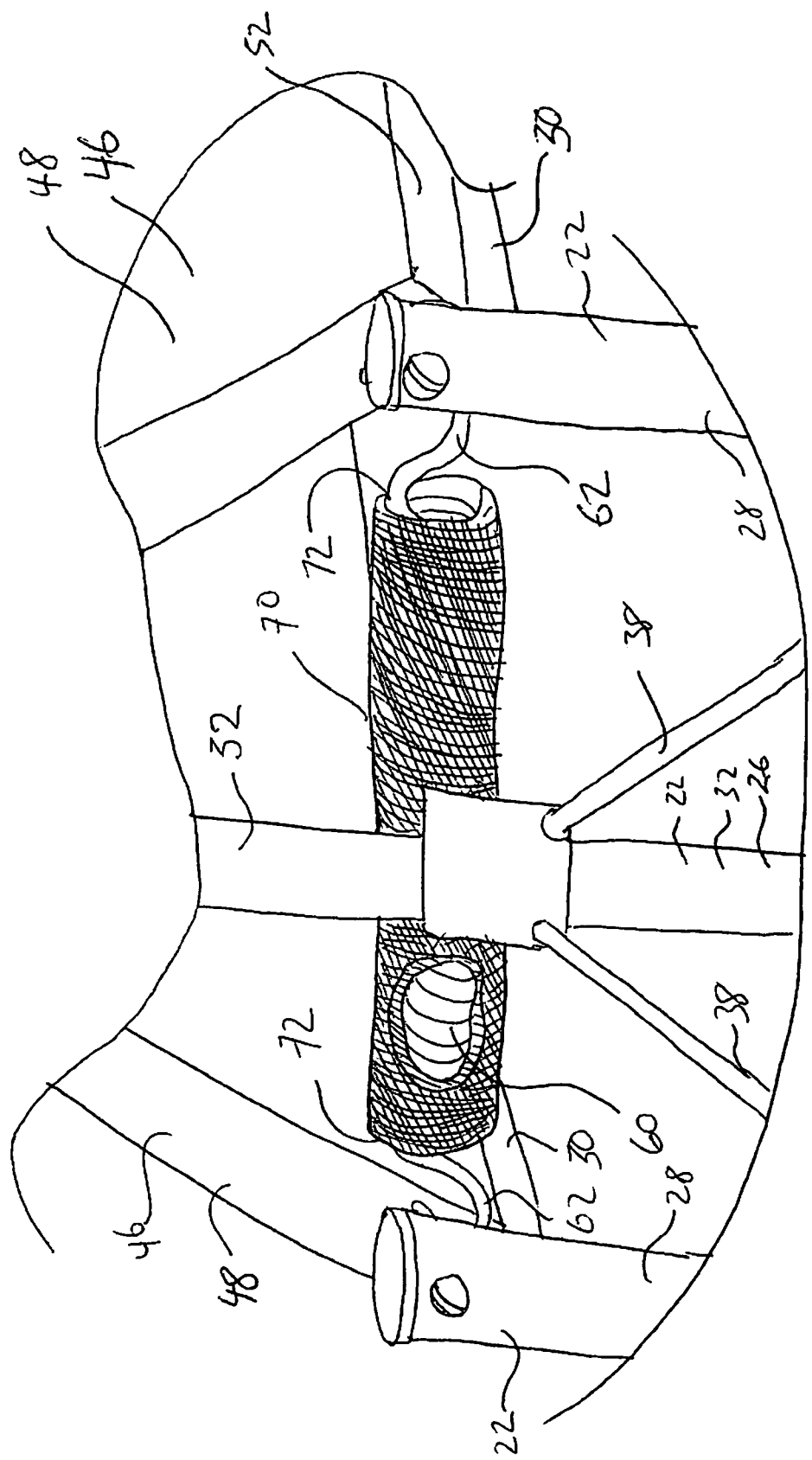
FIG. 3 is substantially perspective cutaway view of the extension coil spring-sheath combination in the resting state.

As substantially shown in FIGS. 1, 2 and 3, the present invention 10 in one possible embodiment could comprise wheeled folding tray cart 20 having at least one extension coil spring 60 that facilitates the opening, closing or both of the wheeled folding tray cart 20, the at least one tension or extension coil spring 60 may be at least partially and movably contained within respective sheath 70 and a method for operating same 200. One such folding wheeled tray cart 20 may comprise a collapsible framework 22 standing on a set of castored wheels 74 or the like foldably supporting a set of split shelves 46. The framework 22 can collapse together to lift and fold the split shelves 64 to allow the folding wheeled tray cart 20 to be placed in a folded storage condition 12. The framework 22 could likewise be pulled apart to lower and unfold split shelves 46 to place the folding wheeled tray cart 20 in unfolded operating condition 14.

The framework 22 could comprise vertically oriented inner framework section 26 that is generally located between two vertically-oriented outer framework sections 24, these three framework sections are generally movably held in a parallel relationship to one and other. Each outer framework section 24 could be a rectangular-shaped and generally comprise two parallel and spaced-apart vertical spars 28 connecting two spaced-apart and parallel horizontal spars 30. Additional horizontal spars 30 could be located between the first two horizontal spars 30 further connecting to the vertical spars 28 for additional framework structural support. Each additional horizontal spar 30 could generally match up with an outer edge 52 of a respective additional half shelf 48 located between the top and bottom split shelving 46. Each outer framework section 24 could be located along one side of the wheeled folding tray cart 20 along a set of outer edges 52 as presented by a set of split shelves 48. The outer framework sections 24 could be pivotally connected to the corners of the set of split shelves 48.

The inner framework section 26 could comprise two inner vertical spars 32 with each inner vertical spar 32 being pivotally with a respective end of folding wheeled tray cart 20. A respective inner vertical spar 32 could be pivotally connected half shelving pair together approximate to their respective inner edges 54. In one possible embodiment, at least one inner vertical spar 32 could further comprise a handle 34 (e.g., substantially located at the top of inner vertical spar 32) that allows the lifting upward of the vertical inner spar 32 (which may move the folding wheeled tray cart 20 from an open unfolded operating position 14 to folded, collapsed storage position 12.) The handle 34 could also be configured to act as a locking device to hold the folding wheeled tray cart 20 in an open or unfolded operating position 14 (e.g., resisting a bias of stretched tension spring[s] 60), the closed storage position 12 or both.

One possible embodiment of inner vertical spar 32 be movably connected to slider 36 movably connected to the inner vertical spar 32. The slider 36 may further pivotally connects to ends of two support struts 38. The other ends of the support struts 38 may be splayed outward to pivotally connect to the respective vertical spars 28 of the outer frame sections 24 on one end of the wheeled folding tray cart 20. In this manner, as the outer framework sections 24 moves into or out of the folded storage position 12, the support struts 38 may allow slider 36 to move along a length of the inner vertical spar 32 (e.g., or may generally allow the inner vertical spar 36 to move though the slider 36) via the folding and unfolding action of split shelves 46. This slider action may help the folding wheeled tray cart 20 transition smoothly between operating and storage positions 14, 12. The slider 36 may further removably connect to the bottom of the handle 34 (e.g., locking device) to help hold the folding wheeled tray cart 20 in the unfolded or operative position 14 until locking device 34 is activated to release the slider 36 and allow the folding wheeled tray cart 20 to be moved into a folded storage position 12.

The framework 22 may movably hold a set of split shelves 46 in a generally horizontal, parallel and spaced-apart operating or unfolded position. Each split shelf 46 can be split along the respective longitudinal centerline to form at least two half shelves 48 that are held together in a pivotal relationship by the framework 22. The framework 22 pivotally holds the each split shelf 24 in a manner that allows the center of each split shelf 46 (e.g., generally demarcating where the respective half shelves 48 of the split shelf 46 meet) and the inner framework 26 to move upward allowing the corresponding half shelves 26 to generally fold together like inverted butterfly wings or accordion fashion (e.g., substantially like an upside down "V".) This closing action moves the outer frame sections 24 closer one another and closer to the inner frame section 26 that is moved upward to substantially form a collapsed storage position 12. In the collapsed storage position 12, the center sections of the split shelves 46 and the inner edges 54 of the half shelves 48 are also raised up so outer edges 52 of half shelves 48 (e.g., split shelf 46) brought are closer together.

In moving towards the operative position 14, the center of the split shelf 46 may drop down, moving the outer framework sections 24 further apart from each other; lowering the inner framework section 26; placing the respective half shelves 48 of a respective split shelf 46 flat in the same horizontal plane; locating each split shelf 46 in spaced-apart and parallel relationship to one another.

The invention 10 could further comprise one or more extension or tension coil springs 60. Each extension coil spring 60 could have curled or curved ends 62 that attached to the top of vertical spar 28 where the vertical spar 28 pivotally connects proximate to the outside corner of the half shelf 48 by the half shelf's end edge. When the top split shelf 46 is in the horizontal operative position, the extension coil spring 60 could be stretched and could be bent to impart a bias to the movement of the half shelves and framework to the storage position 12 to deliver the split shelves 48 towards the inverted folded butterfly wing orientation. As the folding wheeled tray cart 20 is being moved from the folded storage position 12 into the operating open position 14 by the operator pushing down on the wheeled folding tray cart 20 (e.g., tops of the inner vertical struts 32, top split shelves 64 or both); the half shelves 48 could reach their respective full horizontal, planar positions. The bias or tension exerted by the stretched extension spring(s) 60 could bring about a final snap down/slamming shut movement of the half shelve pairs 48 into their full horizontal operative positions. This final snap down movement could provide a crush or pinch injury to an operator's fingers/hands (not shown) placed in a gap formed between the opposing half shelves 46 (e.g., of the top split shelf 46) during this final portion of the opening action.

The wheeled folding tray cart 20 could further comprise a sheath 70 (e.g., tube or sleeve) that could have double open-ends 72 that continuously connects a hollow interior with the sheath exterior. The sheath 70 could be made of suitable material (such a plastic) that could be resilient to a bending that could be imparted by the extension coil spring 60 to the sheath 70 as the extension spring 70 bends and expands due the opening action of the folding wheeled tray cart 20. The length of the sheath 70 could slightly smaller than the length of the extension coil spring 60 when in the resting state (e.g., when the wheeled folding tray cart 20 is in the closed or folded position 12) to allow the curled ends of the extension coil spring 60 to be attached to the framework 22. The sheath diameter could sufficient to accept the placement of the extension coil spring 60 to allow the sheath 70 to slipped over one curved end of the extension coil spring 60 and be pulled or other placed over the extension coil spring 70. The sheath thickness could be sufficient to allow the material that the sheath is made of to impart a resilience to generally resist a movement of extension spring 60 relative to the sheath 70 (e.g., a bending of the sheath 70 by force imparted by the extension coil spring 60 when the folding wheeled tray cart 20 is placed into the open operating position 14.)

In one possible embodiment, the sheath 70 could accordingly impart resistance to the bending movement of the extension coil spring 60 in a manner that may slow down the extension spring's movement when the extension coil spring 60 is moving between a relaxed (e.g., folded storage position 12) state to an extended (unfolded operating position 14) state. The resistance to extension spring movement could slow the extension coil spring's (e.g., extending, contracting or both) movement and correspondingly slow the folding movement of the folding wheeled tray cart 20 between the operating and storage positions 14, 12.

In one possible embodiment, the sheath 70 could slow the tray's opening-closing process to a movement midpoint between the two positions or states. At the movement midpoint, the operator could have to exert more pressure upon the folding wheeled tray cart 20 to more slowly complete the opening or closing of the folding wheeled tray cart 20. Slowing the opening process could give the operator more time to notice and remove any hand or other body portions from the half shelving's closing gap (e.g., moving the operator's hands/fingers out of being between the half shelves' inner edges) to prevent possible crushing or pinching injuries.

Figure 4:
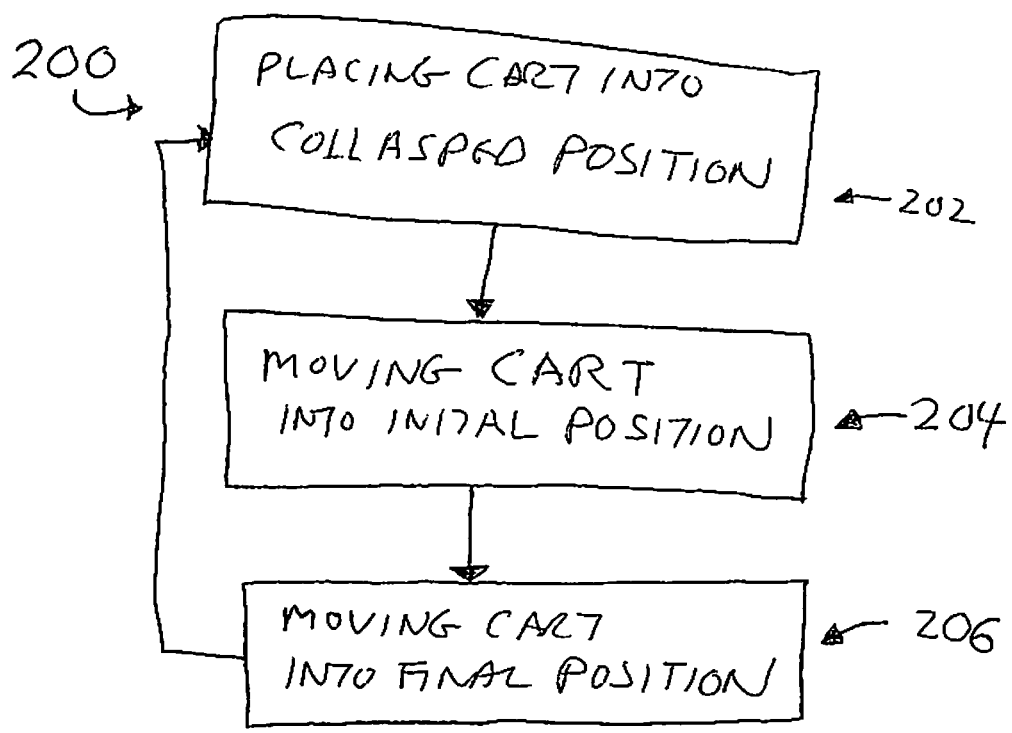
FIG. 4 is substantially a schematic flowchart showing one possible embodiment of a process or method for operating the invention.

As substantially shown in FIG. 4, one possible embodiment of a method or process 200 of operating the invention 20 could commence with step 202, placing wheeled folding tray cart into the collapsed storage state. Locking devices (e.g., as formed by the vertical inner spar handle), if any, could then be accessed, released and be used to pull the inner framework's inner vertical spars upward. This action, assisted by the bias force imparted by a stretched and sheathed extension coil spring, could move the inner edges of the half shelving upward; move the two outer support frames towards one another and the inner framework; move the individual split shelfing towards an inverted folded butterfly or "V" configuration. The folding wheeled tray cart could be held in the compacted or folded configuration a bias imparted by the extension spring(s), locking device(s) or both. In this folded storage position, the extension coil spring(s) are in their generally unstretched (e.g., relaxed) state and are generally covered by the respective sheath except for their curved spring ends. At the close of this step, the process 200 could proceed to step 204, moving the folded, wheeled tray cart into initial opening position.

In step 204, moving the folding wheeled tray cart into initial opening position, the operator could unlock any locking devices holding the folding wheeled tray cart in the folded storage position. The weight of the split shelving could help move inner vertical spars downward; move the outer framework sections out and apart from one another and the inner framework; move shelving halves of respective split shelves down away from the inverted "V" configuration to a horizontal planner orientation. This movement may cause the extension coil spring(s) to extend by the outer framework sections pulling the curves spring ends away from one another possibly imparting a bending force upon the sheath which the sheath may resist. The combination of sheath movement resistance and increasing imparted spring tension could slow this opening movement to a midpoint position of the opening process (e.g., requiring additional operator inventor force to complete the task.) At the substantial competition of this step, the process 200 could proceed to step 206, moving the folding wheeled tray cart into complete opening/operating position.

In step 206, moving the folding wheeled tray cart into complete open/operating position, the combination of spring bias (towards the closed position) and sheath resistance (to spring movement) has generally stalled out the opening movement of wheeled, folding tray cart by the cart's own weight, movement of the half shelving dropping down towards the horizontal orientation. Generally, operator intervention may be required to complete the cart opening process. The operator may need to get more effective downward movement than can be afforded by pushing down on the top half shelving. The operator may have remove hands from the top half shelving (generally away from pinching/crushing injury impact surfaces) and use hands instead to push down on the tops of the inner vertical struts (e.g., of the inner framework section) complete moving the folding wheeled tray cart into open and flat operative position. As the operator continues to move the cart to the complete open position, the imparted spring tension may still cause the sets of half shelving to snap shut but with the operator's hands out of danger's way, crushing and pinch injuries may be avoided. The process may repeat by returning to step 202, placing wheeled folding tray cart into the collapsed storage state.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:
1. A method of operating a wheeled folding tray cart, but not necessarily in the order shown:
(A) providing a wheeled folding tray cart comprising a collapsible wheeled framework pivotally supporting a set of split shelves, each split shelf comprises a pair of half shelves to allow the wheeled folding tray cart to move between an open operating position wherein the set of split shelves are held in spaced-apart, stacked, horizontal orientation within the collapsible wheeled framework and a closed storage position wherein the collapsible wheeled framework is collapsed in manner to move each half shelf pair into an accordion-like, inverted V-shaped configuration, an extension coil spring pair attached to the collapsible wheeled framework slows the movement of the wheeled folding tray cart between the open operating position and the closed storage position, a sheath encloses at least a portion of the extension coil spring of the extension coil spring pair allowing the ends of the extension coiled spring, of the extension coil spring pair to be exposed and be located proximate to an end of one split shelf to continuously connect two outer rectangular framework sections together, the sheath's diameter and thickness are configured and sheath material to be selected to provide resistance to the extension coil spring's bending motion within to the sheath to otherwise slow the wheeled folding tray cart movement between the open operating position and the closed storage position;
(B) moving the collapsible wheeled framework by bending the extension coil spring and the sheath together; and
(C) resisting the bending movement of the extension coil spring by the sheath to slow the movement of the collapsible wheeled framework between the open operating position and closed storage position.
2. The process of claim 1 further wherein the step of resisting the bending movement further comprises a step of slowing a movement of the collapsible wheeled framework at a midpoint position between the open operating position and closed storage position.
3. The process of claim 1 wherein the step of resisting the bending movement further comprises a step of slowing a movement of the collapsible wheeled framework at a midpoint position between the open operating position and closed storage position.
4. The process of claim 3 wherein the step of slowing a movement of the collapsible wheeled framework further comprises a step of applying additional force by an operator upon the collapsible wheeled framework to move the collapsible wheeled framework past the midpoint position.

5. The process of claim 4 wherein the step of applying additional force further comprises of step of moving the operator's hand from a gap formed by inner edges of a half shelf pair.

6. The process of claim 3 wherein the step of slowing a movement of a collapsible framework further comprises a step of slowing a movement of a half shelving pair into a full horizontal position.

* * * * *